E. L. AIKEN.
GEAR WHEEL.
APPLICATION FILED MAR. 11, 1921.

1,427,892.

Patented Sept. 5, 1922.

INVENTOR
Edward L. Aiken
BY
A. D. F. Libby
ATTORNEY

Patented Sept. 5, 1922.

1,427,892

UNITED STATES PATENT OFFICE.

EDWARD L. AIKEN, OF EAST ORANGE, NEW JERSEY, ASSIGNOR TO SPLITDORF ELECTRICAL COMPANY, OF NEWARK, NEW JERSEY.

GEAR WHEEL.

Application filed March 11, 1921. Serial No. 451,538.

*To all whom it may concern:*

Be it known that I, EDWARD L. AIKEN, a citizen of the United States, residing at East Orange, in the county of Essex, State of New Jersey, have invented certain new and useful Improvements in Gear Wheels, of which the following is a description, reference being had to the accompanying drawing and to the figures of reference marked thereon.

This invention relates to gear wheels.

The main object of this invention is to produce a gear wheel which shall be practically noiseless in operation.

Another object of the invention is to make a gear wheel which shall be easy and cheap to manufacture.

Other and further objects will appear after reading the accompanying specification and claims in connection with the accompanying drawings in which:

Figure 1:
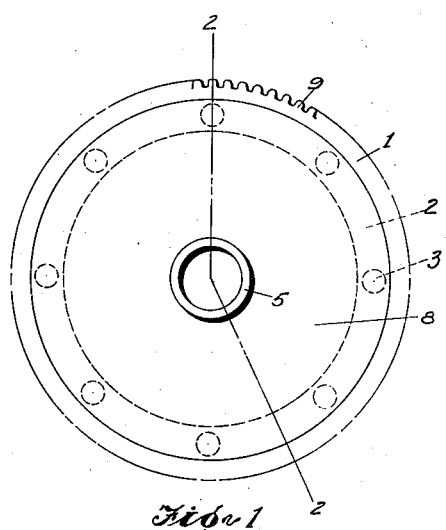
Figure 1 is a plan view of a gear wheel constructed in accordance with my invention, hidden parts being shown in dotted lines.
Figure 2:
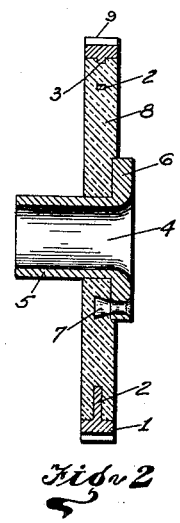
Figure 2 is a section through the gear taken along the line 2—2 of Fig. 1.
Figure 3:
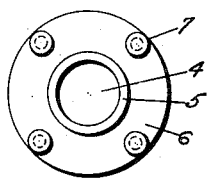
Figure 3 is a plan view of the hub of the gear wheel.

According to my invention a metallic ring 1 having an internal flange 2 is punched, die cast or otherwise formed, the flange being provided with circular openings 3. The ring is T-shaped in cross section as is clearly shown in the lower part of Fig. 2. A metallic hub 4 is provided, said hub comprising a sleeve 5 and a flange 6, the flange being provided at intervals with projections 7 preferably of inverted conical form and preferably in the form of pins driven into the flange and riveted thereto, as shown in Figs. 3 and 2. The hub and ring are placed in a mold and a non-metallic binder 8, preferably in the form of a phenolic condensation product such as bakelite is molded about the flange of the ring and into the openings 3 and binds the hub and ring together. The outer circumference of the ring is then milled, as is the common practice, to form the teeth 9 and the gear wheel is then completed.

Figure 4:
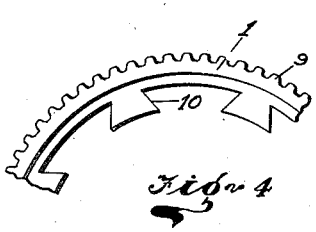
Figure 4 is a fragmentary portion of a modified form of the ring of my gear wheel.

In the form of invention illustrated in Fig. 4, the openings 10 are substantially dove-tailed for greater convenience in die-casting and in order to secure a better grip of the binding material on the ring when the binder shrinks on cooling after the moulding operation.

The rim of the gear wheel being wholly metallic resists wear and is superior to the noiseless gear wheels made of laminated or wholly moulded material or to gears the teeth of which are made of composite metallic and non-metallic material. It is well known that metallic gear wheels are noisy in operation due to the vibrations thereof while in operation and due to the large area of the gear wheel which may vibrate. The binder 8 and the absence of a large metallic surface insures a deadening of any sonorous vibrations to which the gear wheel may be subjected and insures quiet operation thereof.

Having thus described my invention, what I claim is:

1. A gear wheel having a metallic internally flanged, toothed rim with openings therein, a metallic hub having an outwardly extending flange and a non-metallic filler moulded about said rim flange and in the openings thereof, and also about a portion of the hub and the outer periphery of its flange, and further means on the hub flange adapted to be gripped by the moulding material to prevent rotary movement of the flange and hub with respect to the rim.

2. A gear wheel comprising a metallic toothed rim having an inwardly projecting flange located centrally thereof, a metallic hub having an outwardly extending flange, rigid projections carried thereby, and a disc of non-metallic material of substantially the same width as the rim and having the flange of the rim and the projections of the hub flange embedded therein.

In testimony whereof, I affix my signature.

EDWARD L. AIKEN.